(12) United States Patent  
Rajagopalan (10) Patent No.: US 9,807,946 B2  
(45) Date of Patent: Nov. 7, 2017

(54) VERTICAL LIVING WALL PLANTER

(71) Applicant: Ravi Rajagopalan, Philadelphia, PA (US)

(72) Inventor: Ravi Rajagopalan, Philadelphia, PA (US)

(73) Assignee: PRIDE GARDEN PRODUCTS, Ridley Park, PA (US)

( * ) Notice: Subject to any disclaimer, the term of this patent is extended or adjusted under 35 U.S.C. 154(b) by 396 days.

(21) Appl. No.: 14/328,980

(22) Filed: Jul. 11, 2014

(65) Prior Publication Data

US 2015/0013223 A1    Jan. 15, 2015

Related U.S. Application Data

(60) Provisional application No. 61/845,630, filed on Jul. 12, 2013.

(51) Int. Cl.  
*A01G 9/02* (2006.01)

(52) U.S. Cl.  
CPC ............ *A01G 9/025* (2013.01); *Y02P 60/244* (2015.11)

(58) Field of Classification Search  
CPC ........ A01G 9/022; A01G 9/023; A01G 9/025; A01G 9/02; A01G 31/06  
See application file for complete search history.

(56) References Cited

U.S. PATENT DOCUMENTS

| | | | | |
|---|---|---|---|---|
| 5,373,662 A * | 12/1994 | Wickstrom | ............ | A01G 9/022 47/65.9 |
| 5,438,797 A | 8/1995 | Lendle | | |
| 5,647,695 A * | 7/1997 | Hilfiker | .................... | E01F 8/025 405/258.1 |
| 7,536,829 B2 * | 5/2009 | Genma | .................... | A01G 9/02 47/66.5 |
| 7,621,075 B2 | 11/2009 | Rajagopalan | | |
| 8,438,781 B2 | 5/2013 | Zhao et al. | | |
| 8,469,722 B2 | 6/2013 | Huang | | |
| 2007/0199241 A1 * | 8/2007 | Peleszezak | ............. | E01F 8/022 47/65.9 |
| 2008/0000153 A1 * | 1/2008 | Sugiyama | .............. | A01G 9/025 47/47 |
| 2010/0095586 A1 * | 4/2010 | Sichello | .............. | E04F 13/0801 47/65.9 |
| 2010/0146855 A1 * | 6/2010 | Ma | ......................... | A01G 9/025 47/82 |
| 2010/0313473 A1 * | 12/2010 | Cussol | .................... | A01G 9/022 47/65.7 |
| 2011/0107667 A1 * | 5/2011 | Laurence | ............... | A01G 9/025 47/59 S |
| 2011/0146147 A1 * | 6/2011 | Irwin | ..................... | A01G 9/025 47/66.5 |
| 2011/0146150 A1 * | 6/2011 | Lyon | ...................... | A01G 9/025 47/70 |

(Continued)

FOREIGN PATENT DOCUMENTS

FR    WO 2007014993 A1 *   2/2007  ............. A01G 9/025  
FR    2902283 A1 *  12/2007  ............. A01G 9/025

(Continued)

*Primary Examiner* — Son T Nguyen  
(74) *Attorney, Agent, or Firm* — Cozen O'Connor (57) ABSTRACT

A vertical planter having a partitioned tray, a liner, and a sliding wire support grid, wherein the partitioned tray engages the sliding wire support grid to provide access to the partitioned tray.

13 Claims, 7 Drawing Sheets

(56) References Cited

U.S. PATENT DOCUMENTS

2011/0197506 A1* 8/2011 Zhao .................. A01G 9/025
                                                                  47/82
2012/0297679 A1* 11/2012 Busch ................. A01G 9/022
                                                                  47/62 R

FOREIGN PATENT DOCUMENTS

| FR | 2902602 A1 * | 12/2007 | ............. A01G 27/00 |
| GB | 2412558 A * | 10/2005 | ............. A01G 9/025 |
| JP | 2004254565 A * | 9/2004 | |
| JP | 2004283119 A * | 10/2004 | |
| JP | 2005211035 A * | 8/2005 | |
| JP | 2008263958 A * | 11/2008 | |

* cited by examiner

VERTICAL LIVING WALL PLANTER

CROSS-REFERENCE TO RELATED APPLICATION

This application claims priority to U.S. provisional application Ser. No. 61/845,630 filed Jul. 12, 2013, which is incorporated herein by reference in its entirety.

FIELD OF THE INVENTION

Presently disclosed embodiments are related to vertical growing wall planters, and particularly suited to vertical growing wall planters providing small and industrial scale applications for vertical growing of any number of plants.

BACKGROUND

Vertical planters are typically plagued with a number of problems, including poor drainage, weakness, and failure to keep the soil within the vertical planter. Indeed, planters frequently are over watered or under watered, thus killing the plants. Other times, the soil falls out of the planter, or the planter is either so heavy it is difficult to hang, or is flimsy and fails.

These issues were addressed, to some extent, for example, in U.S. Pat. Nos. 5,438,797 and 8,438,781. However, each of these patents do not completely address the problems associated with over watering, under watering, the addition or removal of soil, weight limitations, and issues with structural rigidity, or they suffer from other complexities that prevent their use in the marketplace.

There is a need for a planter that is both simple to use and to manufacture, supports various different planting media, various types of plants, provides good flow of water through the planter, supports the growth media, and is still lightweight for both manufacturing and shipping needs.

SUMMARY

Embodiments of the present disclosure relate to a vertical living wall planter comprising: a vertical planter comprising a slotted tray having a length, a width, a depth, a front and a back, and a top and a bottom, a liner, and a sliding wire grid, wherein said slotted tray aligns with the sliding wire grid and said liner to create secure openings for plant material, wherein said plant material extends from the slotted tray, through the liner and grid and the roots of said plants are contained within the slotted tray and liner.

An additional aspect of the present disclosure includes a vertical wall planter comprising a tray having a length, a width, a depth, a front and a back, and a top and a bottom, a liner, a sliding wire grid, and a frame; wherein said tray comprises horizontal partitions; wherein said horizontal partitions are angled towards the top and measure about 60 to 90 degrees as measured from the vertical; and wherein said liner comprises predetermined openings that align with the partitions in the tray; and wherein said frame further comprises predetermined openings that align with the openings in the liner and the partitions in the tray.

An additional aspect of the present disclosure includes vertical wall planters comprising a tray having horizontal partitions angled upwards at about 60 to 89 degrees as measured from vertical; wherein said horizontal partitions comprise plurality of holes of about 10 mm in diameter situated about 5 to about 20 mm from the back of the tray along the length of the horizontal partition; and wherein the top and bottom of said tray also comprise holes of about 10 mm in diameter situated about 5 to about 20 mm from the back of the tray along the length of the top and the bottom portions of the tray; and wherein the vertical wall planter further comprises a liner, a sliding wire grid, and a hanging means; wherein said liner is situated between the horizontal partitions of the tray and the sliding wire grid.

A vertical planter comprising a partitioned tray, a liner, and a sliding wire grid, wherein said partitioned tray having a length, a width, a depth, a front and a back, a top and a bottom, and rails along three sides that align with the sliding wire grid, which comprises tracks that engage with the rails of the tray, and wherein said liner further aligns with openings in said sliding wire grid and partitions in said tray to create sectioned openings.

A vertical wall planter comprising a tray, a liner, a sliding wire grid, and a frame; wherein said tray, having a length, a width, a depth, a front and a back, side rails, a top rail, and a top and a bottom, comprises horizontal partitions; wherein said horizontal partitions are angled in a vertical manner measure about 60 to 89 degrees as measured from the partition to the back of the tray; and wherein said liner comprises predetermined openings that align with the partitions in the tray; and wherein said wire grid further comprises predetermined openings that align with the openings in the liner and the partitions in the tray.

A vertical planting system comprising a tray, a wire grid, and a liner; wherein said tray comprises two sides, a top and bottom, and at least one partition; wherein said at least one partition is secured to said tray bottom and sides and oriented towards the vertical at an angle of about 60 to 89 degrees; and wherein said at least one partition comprises at least one hole extending through said partition; said tray further comprises at least three tray rails, aligned along said top of the tray and along the two sides of the tray; wherein said wire grid comprises a plurality of openings, wherein the sides and top further comprise a track having a U-shaped feature which selectively engages with the tray rails so as to allow said tracks to slide along the sides of the tray rails, and wherein the third sliding member secures around the top side of the tray rail; further wherein said liner comprises a membrane sandwiched between two fibrous material having openings cut at predetermined positions to align with the wire grid.

A further embodiment is a vertical planting system comprising a frame, a partitioned tray, a wire grid, and a liner; wherein said partitioned tray comprises a two sides, top and bottom of the tray, and at least one partition; wherein said bottom of said tray and said partition are angled up at about 75 degrees; and wherein said top, bottom, and each partition each comprise at least one hole; said tray further comprises at least three tray rails, aligned along said top of the tray and along the two sides of the tray; wherein said wire grid comprises a plurality of openings, four sides, wherein three of the sides further comprise a track, which curves 180 degrees to a U-shape, so as to provide for parallel member below the wire grid; said sliding members capable of sliding along the sides of the tray rails, and wherein the third track secures around the top side of the tray rail; further wherein said liner comprises a plastic material sandwiched between two fibrous material having openings cut at predetermined positions to align with the wire grid; and further comprising a reservoir and a drip tray attached to said frame.

DETAILED DESCRIPTION OF PREFERRED EMBODIMENTS

All references cited herein are hereby incorporated by reference in their entirety.

As used herein, the term "about" is intended to encompass a range of values ±10% of the specified value(s). For example, the phrase "about 20" is intended to encompass ±10% of 20, i.e. from 18 to 22, inclusive.

The invention described herein is a type of planter intended to be hung on a vertical or near vertical wall. The idea behind such a vertical planter is that a consumer may hang the planter, either inside or outside, fill the planter with a growth medium, and then plant seeds or directly plant live plants into the planter. Indeed, the planter is designed to securely hold plants in the planter, securely hold dirt, and also allow for easy watering while being in the vertical position.

Figures 1, 1C:
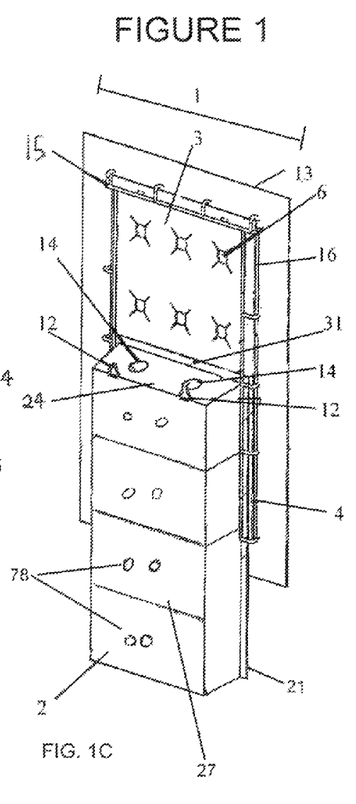
FIGS. 1A, 1B, 1C, and 1D are representative drawings of one embodiment of a vertical planter as described herein.
Figures 1A, 1B:
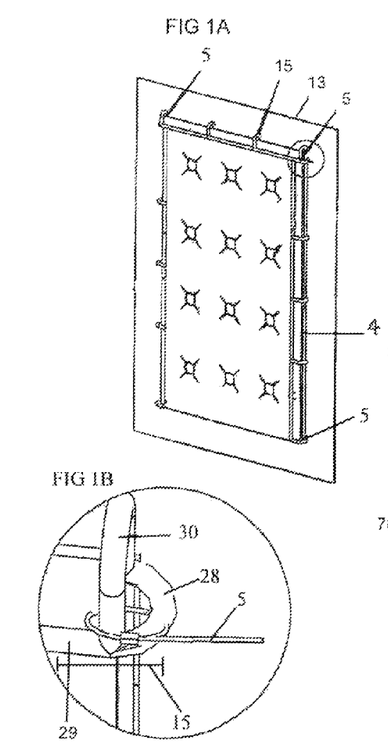

In view of FIGS. 1A, 1B, 1C, and 1D, an embodiment of the vertical wall planter 1 is identified. There is a planter tray 2, a liner 3, a wire grid 4, and zip ties 5, that secure the wire grid 4 to the liner 3. In particular, FIG. 1A shows the rear side of the wire grid 4, as secured to the liner 3 and the liner holes 6, evenly spaced on the liner 3. A frame 13 is also secured to the wire grid 4.

In view of FIG. 1B, a detail of the top right corner of FIG. 1A is shown. In particular, detail of the grid top frame 15 is shown and the zip tie 5. The grid top frame 15 includes three additional features, a top frame side 28, a top frame bottom 29, and a top frame top 30. The purpose of the grid top frame 15 is to secure the wire grid 4 to the top of the planter tray 2. By having a top frame top 30, and the side 28, and bottom 29, the grid top frame 15 becomes a track and can slide over the top rim 31, and when situated in a vertical manner, the grid top frame 15, will rest on the top rim 31 and not allow the wire grid 4 to fall. Accordingly, the U shaped top engages with the top rim 31. FIG. 1C, for example, depicts the side tracks 16 as engaged with the tray rim sides 21.

FIG. 1C shows a partial exploded view of an embodiment of the invention, where the planter tray 2, is positioned so that about one half of the wire grid 4, is engaged on the planter tray 2. The wire grid 4, by use of the side tracks 16, is intended to slide on and off the planter tray 2, to allow for easy access to the planter tray 2. The access is provided to fill the planter tray 2 with growth medium, such as soil, bark, vermiculite, or other medium suitable for the particular plants to be grown in the vertical frame planter 1. Hanging tabs 12, are shown at the edge of the tray top 24, and the tray back 27, and allow the planter 1 to be hung. Holes 78 are positioned on the back of the tray 27 and extend through the body of the planter tray. This allows excess water to drain from the tray 2 and allows appropriate air and soil contact to prevent overly wet soil conditions.

In particular, the tray sides 21 serve as a rail, and then the U shaped features on the wire grid 4, e.g. the side track 16 and the top frame top 15, serve as a track. This allows the rails on the side of the tray to slide on the track. On the top side of the tray 2, the top rail then engages with the top frame top 31. This provides an easy mechanism for sliding the wire grid 4 and any accessories attached to it, along the tray 2, while providing for an appropriate mechanism to also secure the wire grid 4 as well as secure the liner 3 between the wire grid and the tray 2.

Figure 1D:
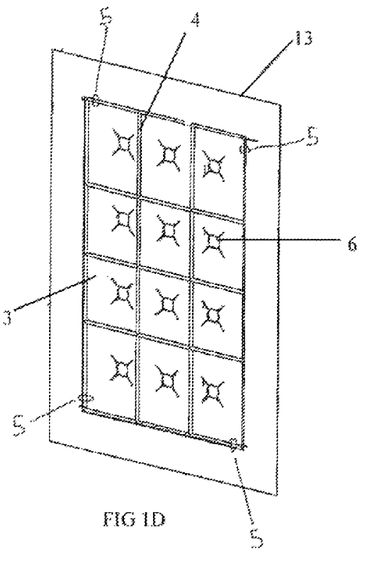

FIG. 1D shows the front of the planter 1, where a frame 13 is situated on the wire grid 4. Furthermore, the liner 3 and the liner holes 6, and also depicted. The liner 3 is secured to the wire grid 4, via fastening devices, such as zip ties 5, at each of the corners of the wire grid 4. This allows the liner 3 to be secured mechanically to the wire grid 4. The liner 3 is also secured to the planter 1 by friction between the wire grid 4, and the tray rim 21, and may also be secured in place by friction between any growth medium and the liner 3. Additional securing mechanisms may be utilized to secure the liner 3 to the wire grid 4, including staples, straps, adhesives, wire, string, or other feature as is known to one of skill in the art.

The liner 3 is made up of coconut fibers or other fibrous material. One possible liner 3 includes those described in U.S. Pat. Nos. 7,621,075 and 8,469,772, e.g. the Aqua-Save™ Coco Liner. However, other suitable liner 3 materials may include any number of suitable porous material and also having strength to support the weight of a growth medium. For example, a non-porous material may be a plastic material. The liner includes liner holes 6, which are precut into the liner and are cut at predetermined locations to allow for a plant or seed to be inserted into the liner and into some growth medium in the planter tray 2.

A preferred liner 3 includes two layers of fibrous material that sandwich a layer of plastic. Alternatively, the layer of plastic may be replaced by other polypropylene or like materials. The materials may be perforated or intact. The intent is to have the liner hold and trap planting medium, such as soil, but still allowing for air movement underneath the liner 3. Accordingly, the material sandwiched between the fibrous material is a semi-permeable membrane that can be permeable to aid, or air and water, but is intended to be not permeable to planting medium, except where holes are placed for plants to extend out from the planter.

Figure 2A:
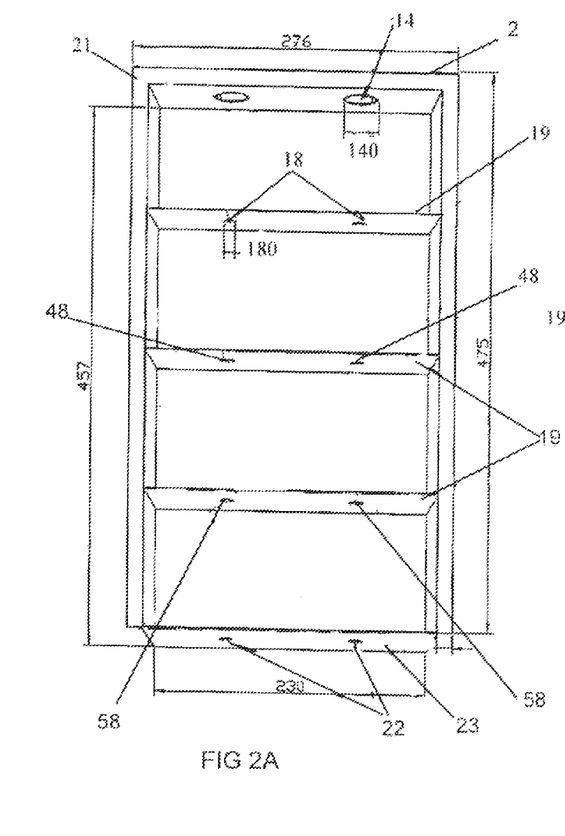
FIGS. 2A, 2B, and 2C, are representative drawings of one embodiment of a vertical planter as described herein.
Figures 2B, 2C:
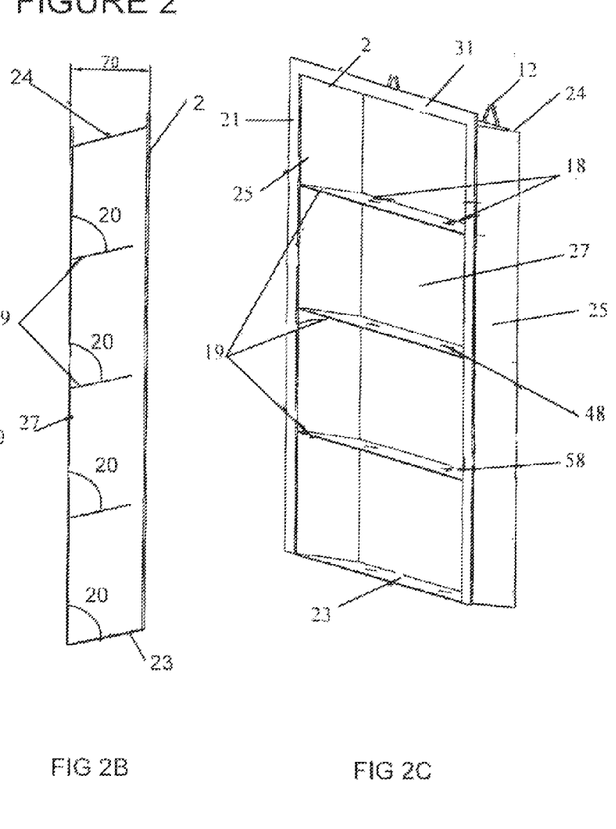

FIGS. 2A, 2B, and 2C depict certain embodiments of the planter tray 2. In particular, the planter tray 2 includes two sides 25, a tray top 24, a tray bottom 23, and a tray bottom 27, a top rail 31 and side tray rails 21. The planter tray 2 is a metal or metal alloy, designed for light weight, ease of construction, and durability. Metals that are resistant to rusting are preferred, as the plants require water, and in some cases fertilizer, which, due to the salt content, may cause corrosion or rust.

Situated within the tray 2 are tray partitions 19. These tray partitions 19 are angled 20, so that they angle towards the vertical. The angle is at about 78 degrees in FIG. 2 and provides that growth medium is less likely to fall out of the planter 1. Furthermore, the angle allows a consumer to water the planter 1 and have water run from the tray top holes 14, through the center tray holes 18, 48, 58, and out the bottom tray holes 22.

However, because of the angle, some water is left in each of the particular partitions, and provides for retention of some moisture for plant and soil uptake, without oversaturation of the planting medium. It is well known that water will move from portions of wetness to dry soil because of potential energy and capillary forces. Accordingly, providing a position within each partition to retain some water provides that the water held in that reserve space will then move to drier soil and help to provide for consistent soil saturation throughout the partition. Accordingly, other angles are also suitable, from about 30 degrees to about 90 degrees, and more preferably from about 45 degrees to about 85 degrees, or about 55 degrees to about 85 degrees, or about 65 degrees to about 85 degrees, or about 75 degrees to about 85 degrees. The tray partitions 19 are welded into place, and are not intended to be moveable. This provides for a stable, rigid support structure, and allows for lightweight materials to be utilized for the tray.

Other embodiments contemplate a tray 2 made of plastic or other suitable material that can be molded or formed into the appropriate shapes and designs as described herein. In those embodiments, the partitions 19 may be molded with the rest of the tray. Alternatively, the partitions 19 may be plastic welded or secured to the tray with an adhesive regardless of the material being utilized. The use of plastic allows for a different manufacturing process for the tray, and allows for potentially less expensive manufacturing, as well as weight reduction. The weight reduction is important when considering planters 1 having a large scale, including dozens, hundreds, or thousands of openings for plants. Thus, it is envisioned that a vertical planter could be sufficiently large to cover a space having a height and length of that of a wall, for example 10 feet tall and 20 feet long. Other lengths and widths are also contemplated, such that a grower could use vertical space in a commercial nature.

The tray top 24 also has tray top holes 14. These tray top holes 14 are intended to be larger than the center tray holes 18, 48, and 58, because a consumer will provide water for the planter through these tray top holes 14. The tray top holes are about 30 mm in diameter. Additional embodiments may include tray top holes 14 from about 10 mm to about 75 mm in diameter, or about 20 to about 50 mm in diameter.

The top holes 14 have the largest diameter 140, and the next center tray holes 18 have a slightly smaller diameter 180. Each subsequent set of holes has a reduced diameter from the previous. This provides that more water flows from the first partition into the second, into the third, etc. Furthermore, in one embodiment, (See FIG. 1C), holes 78 may be advantageously positioned through the rear of the tray 2, to allow excess water to drain from the soil. In combination with the holes in each of the partitions 19, these holes allow for appropriate water drainage through the top holes 14 through the lowest partition, providing even watering to the soil in each compartment.

The partition holes 18, 48, and 58 are situated about 5 mm to about 100 mm from the tray back 27. The center tray holes may be from about 5 mm to about 100 mm, or more particularly about 5 mm to about 40 mm, or about 10 mm from an edge. There may be one, two, or more center tray holes 18, preferably evenly spaced on each of the tray partitions. The center tray holes are about 5 mm to about 100 mm in diameter.

FIG. 2A further provides that the tray 2 has an outer width 276 and inner width 230, an outer length 475 and an inner length 457. These lengths and widths are of size to allow the tray to be paired with the wire grid 4 as depicted in detail in FIG. 3. FIG. 2B further details the depth 70 of the tray 2. The depth 70 can be modified to be wider or narrower to accommodate more or less planting medium, or allow for greater root development. In certain embodiments, large scale applications or for use with larger plants may require additional space to allow the plants to fully develop.

Figures 3, 3C:
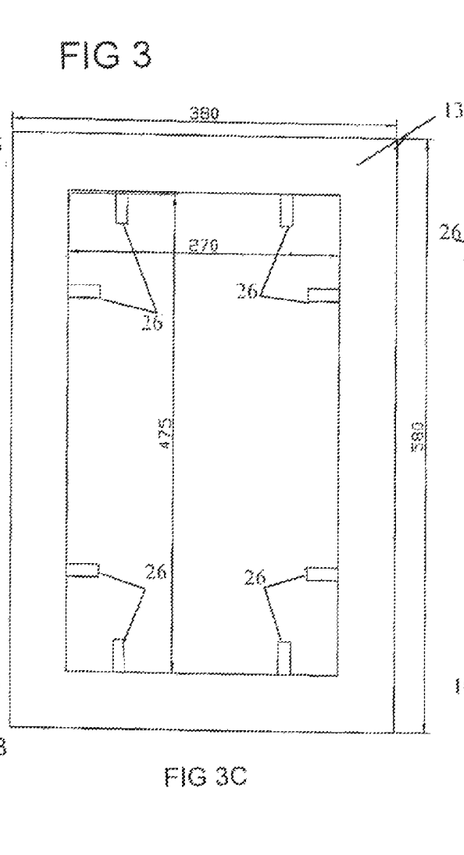
FIGS. 3A, 3B, 3C, and 3D are representative drawings of one embodiment of a vertical planter as described herein.
Figures 3A, 3B:
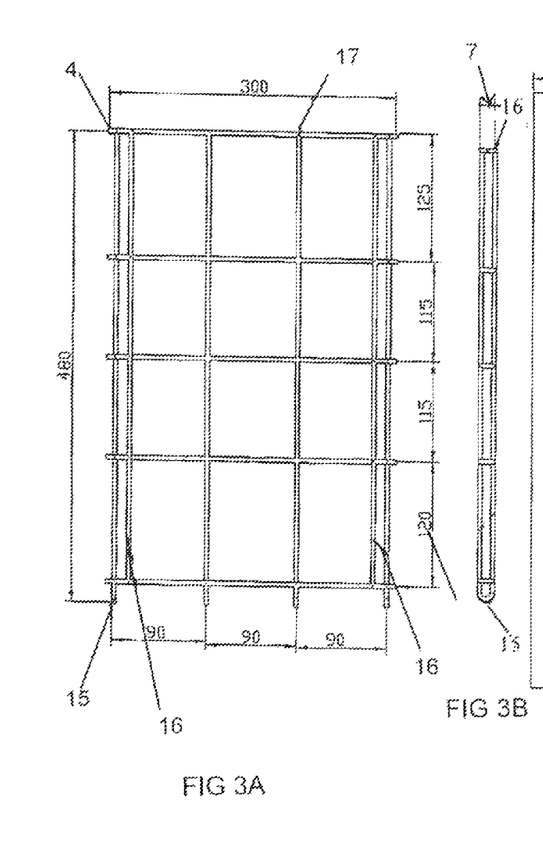

In view of FIGS. 3A and 3B, more detail is show with regard to a wire grid 4. In particular, the wire grid 4 has a grid depth 7, and grid width 90, and a variety of grid lengths 115, 120, 125. The dimensions of these depth, width, and length are based on the overall dimensions of the product. In particular, the depth 7 is based, in part, on the thickness of the tray rim 21, and the thickness of the liner 3, as this thickness corresponds to the track width. The grid width 90 and grid lengths 115, 120, and 125, however, may be modified based on the total number of cells or the space of each of the cells in the embodiment. A 4×3 grid, as show in FIG. 3 comprises 12 cells having a width of about 75 mm to 150 mm and a length of about 75 mm to about 250 mm. In some commercial scale applications the particular width and lengths can be modified to much larger cells, as appropriate for the particular plant to be grown, including larger than 150 mm or 250 mm.

The grid depth 7 is important to allow the wire grid 4 to easily slide over the tray rim 21, and to allow the grid top frame 15, to slide over the tray rim 21 on the top of the planter 1. However, the depth is intended to allow for the liner 3 to be slightly compressed between the tray rim 21 and the wire grid 4, so that the liner 3 is held in place, in part, by the compression between the wire grid 4, the tray rim 21, and the partitions. Furthermore, through this compression, the growth medium that is situated in the planter tray 2 and held beneath the liner 3 is held firm and does not fall out of the planter tray 2 or through the liner 3 or the liner holes 6. This also aids in maintaining appropriate soil compaction for optimal growing conditions.

In another way of describing the features of the wire grid 4, in view of FIG. 1C, the grid slider frame 16, is depicted as positioned with one half of the grid slider frame 16 secured around the tray rim 21. In effect, the tray rim 21, serves as a fixed slide rail, and the grid slider frame 16, slides up and down along the fixed tray rim 21. In view of FIG. 1C, the grid slider frame 16 can slide down over the tray rim 21, and the grid top frame 15 then slides over and onto the top tray rim 31, which also serves as a fixed rail. Once hung on a vertical surface, the tray rim 21 is a vertical slide rail, and gravity will serve to have the grid top frame 15 slide down and over the top tray rim 31.

When the top frame 15, is around the top rim 31, the planter 1 is in the closed position, whereby the planter 1 is ready to hang vertically, and the liner holes 6 match up with the holes in the wire grid 4. Further, in this position, the wire grid 4 is providing optimal support to the liner 3 and the planting medium and plants in the vertical planter 1.

The wire grid 4 is about the same length as the tray 2, so that when the grid top frame 15 is positioned around the top tray rim 31, the grid bottom frame 17 is positioned over the bottom edge of the tray 2. Indeed, in view of FIGS. 3A and 3B, the lengths 480 and 475 are about the same length. This is important to consider where the tray length is manufactured for commercial or large scale purposes, holding dozens, hundreds, or thousands of plants per planter. It is envisioned that there may be dozens or hundreds of columns or rows, e.g. 100 columns and 20 rows, as a non-limiting example.

The wire grid 4 is made of any number of metals, or coated metals, and is arranged, as is seen in FIG. 1D so that the lattice grid provides for openings between the metal that frame each of the liner holes 6. This provides for a simple aesthetic design, but also provides support for each of the individual liner holes 6. The wire grid 4 is designed to slide over and around the planter tray 2 and fits securely, but its ability to slide up and off of the tray 2 allows access to the planter tray 2. This secure fit helps to support the grown medium, the plants, the liner 3, and liner holes 6. In further embodiments, the wire grid 4 may be advantageously made of a plastic or other lightweight material as is known to one of skill in the art.

The wire grid 4 has a different top and bottom ends. The grid top frame 15 has an additional frame support features shown in detail in FIG. 1B, including the top frame side 28, top frame bottom 29, and the top frame top 30, so that the frame cannot slide down the tray rim 21. When hung on a vertical surface, the grid top frame 15 sits on the tray rim 21 of the planter tray 2 and prevents the wire grid 4 from sliding down. Furthermore, this provides that the three sides of the wire grid 4 are secured around the planter tray 2, providing a secure fit for the wire grid 4 and the liner 3.

As compared to the opposing end of the grid bottom frame 17, is open, to allow the wire grid 4 to slide along the tray rim 21, and expose the planter tray 2. This allows quick and easy access to the planter tray 2, and allows a consumer or a company to pre-plant or place planting medium within the tray 2, but prevents the wire grid 4 from sliding or moving once hung. However, having just this bottom end open, provides the necessary support for the wire grid 4 to support the liner 3 and the growth medium in the planter tray.

Figures 6A, 6B:
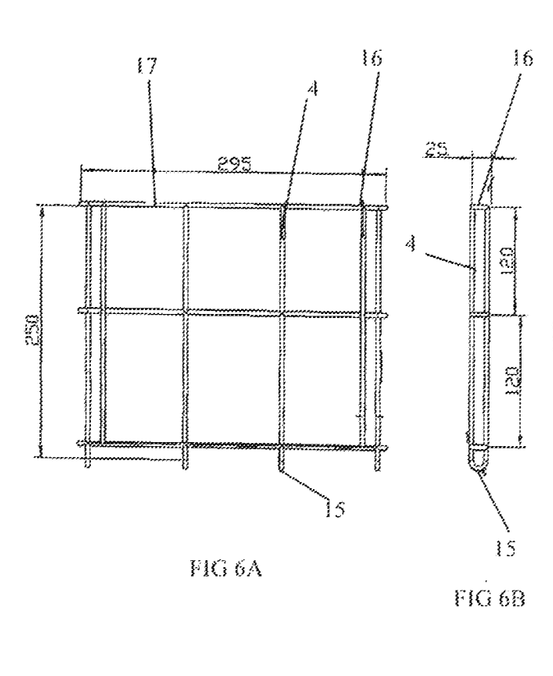
FIGS. 6A, 6B, 6C, and 6D are representative drawings of one embodiment of a vertical planter as described herein.
Figure 6C:
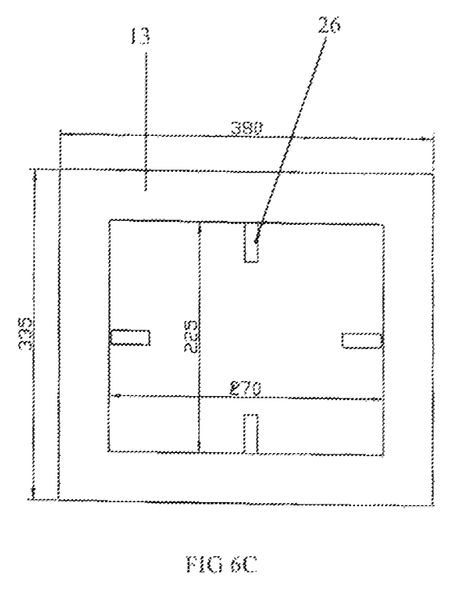
Figure 6D:
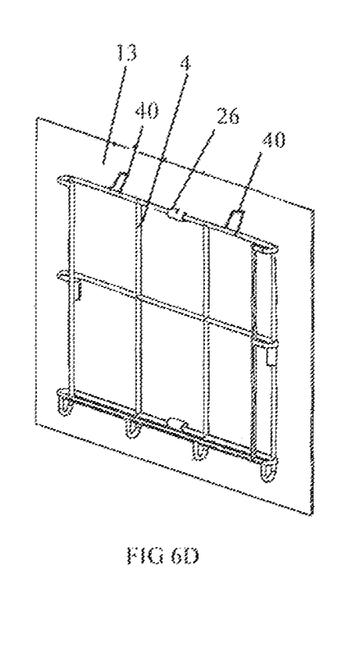

The wire grid 4 may also comprise a locking mechanism, such that the tray rim 21 comprises indentations for the wire grid 4 to lock into place, providing a tight and secure fit. Furthermore, the bottom frame 17 may incorporate a locking mechanism 40, as depicted in FIG. 6D that can further releasably secure the bottom frame 17 to the tray 2. Thus, once the wire frame 4 is in the closed position, the locking mechanism 40 can be latched or secured to the tray 2 and thus provide additional support at the bottom of the wire grid 4. Suitable locking mechanisms include a strap, latch, snaps, hood and loop, magnetic fasteners, hooks, ball and intent, spring latches, wire ties, snap ties, and other similar features as known to one or ordinary skill in the art.

Figure 3D:
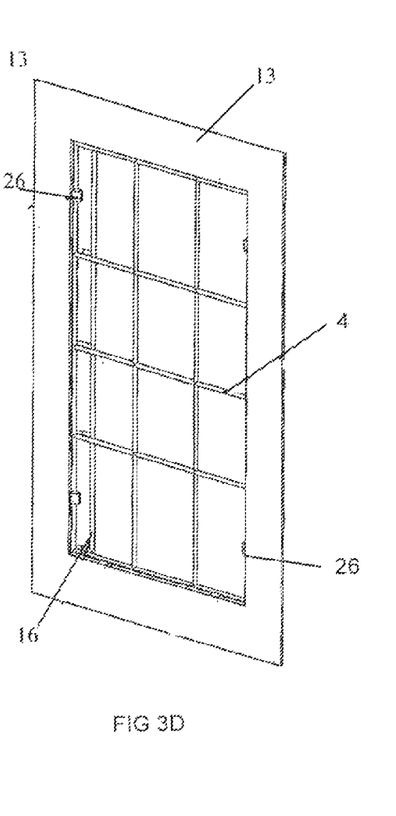
Figures 4A, 4B, 4D:
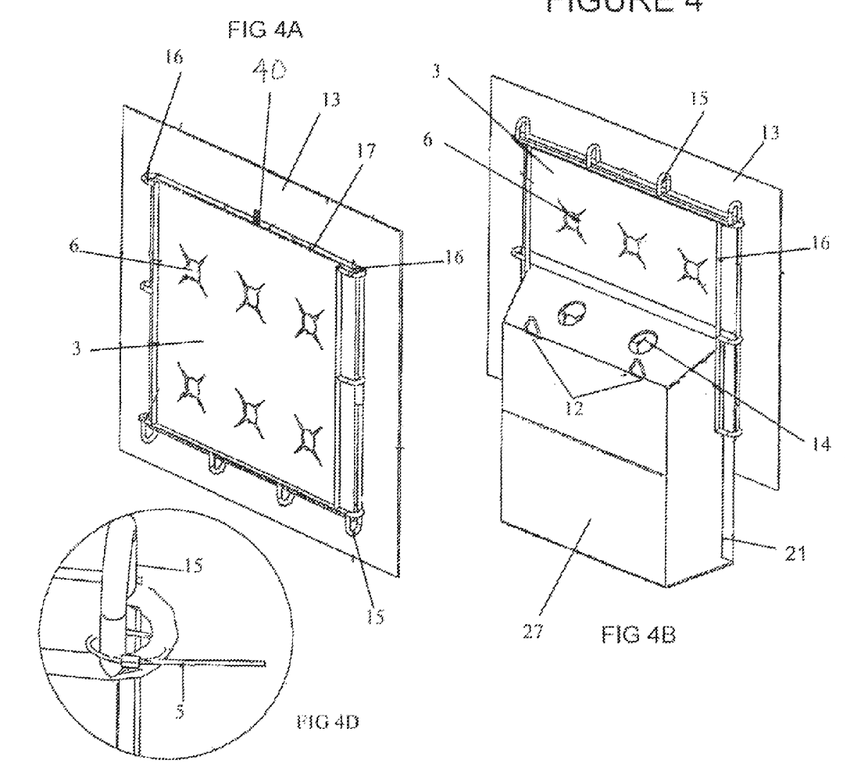
FIGS. 4A, 4B, 4C, and 4D are representative drawings of one embodiment of a vertical planter as described herein.
Figure 4C:
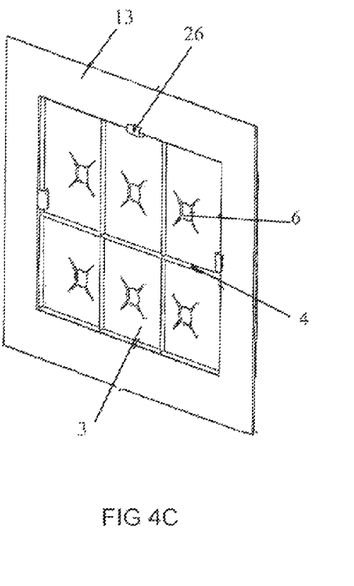

FIGS. 3C and 3D further identify the use of a frame 16 and tabs 26, for securing the frame 16 to the wire grid 4. The frame 13 has an outer width 380 and an inner width 270, and an outer length 580 and an inner length 475. These lengths and widths are intended to be dimensioned so as to pair with the wire grid 4 and the planter tray 2. The frame 16 is a feature that provides increased structure and rigidity to the planter, and also provides an aesthetic design, as it would to a picture. The frame 16 is intended to be a wooden material, however in further embodiments, copper, tin, or other metals are suitable, as are a number of plastics or resin based materials, and including resin with such materials as fiberglass.

FIGS. 4A, 4B, 4C, and 4D depict a further embodiment of the invention described herein. The embodiment comprises six liner holes 6, and thus has half the amount of liner holes as the previously depicted embodiment. The remaining features, however, are generally consistent with the previous embodiment. In particular, FIG. 4A identifies feature a locking mechanism 40 that can be secure to the underlying tray 2 to secure the bottom of the wire grid 4 to the tray.

Figure 5A:
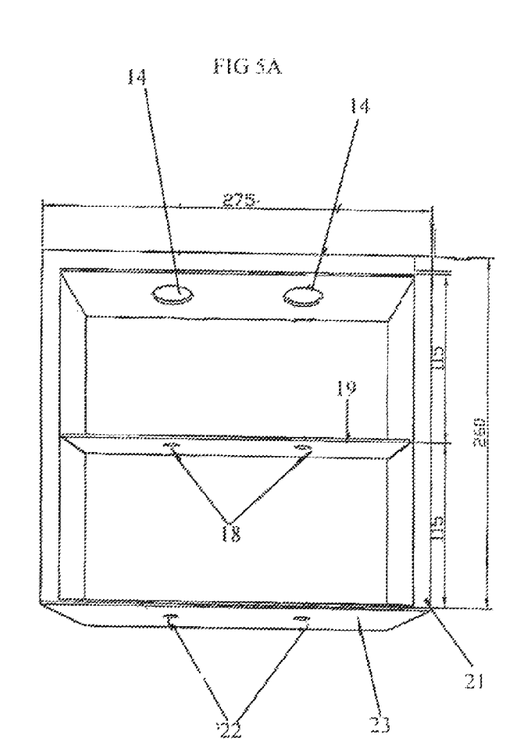
FIGS. 5A, 5B, and 5C, are representative drawings of one embodiment of a vertical planter as described herein.
Figure 5B:
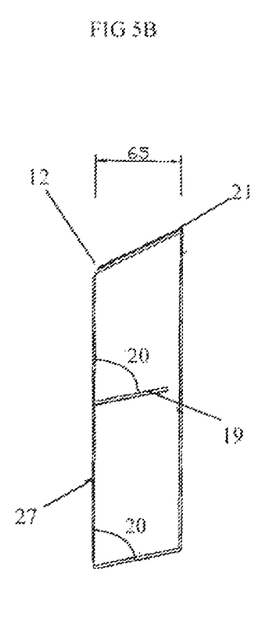
Figure 5C:
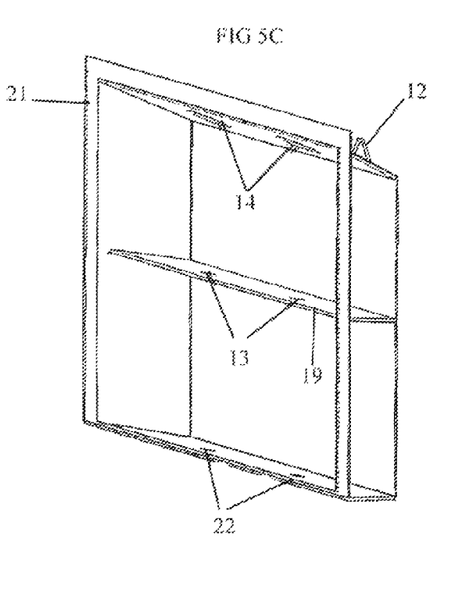

In view of FIGS. 5A, 5B, and 5C, a further embodiment of a planter tray 2 is depicted, having only one tray partition 19. With only 1 partition, the size may be the same as, or smaller or larger than other embodiments with more partitions. However, the concepts remain the same of providing a partition to provide openings for growing plants in a vertical planter.

In view of FIGS. 6A, 6B, 6C, and 6D, a further embodiment of the wire grid 4, and the frame are depicted. As the dimensions change, the lengths 250 and width 295, of the frame change. Typically the depth of the frame 25 will not be modified significantly over other embodiments. Similarly, in view of FIG. 6C, the length and widths 335, 380, 225, and 270 will change based on the modified dimensions.

Figure 7A:
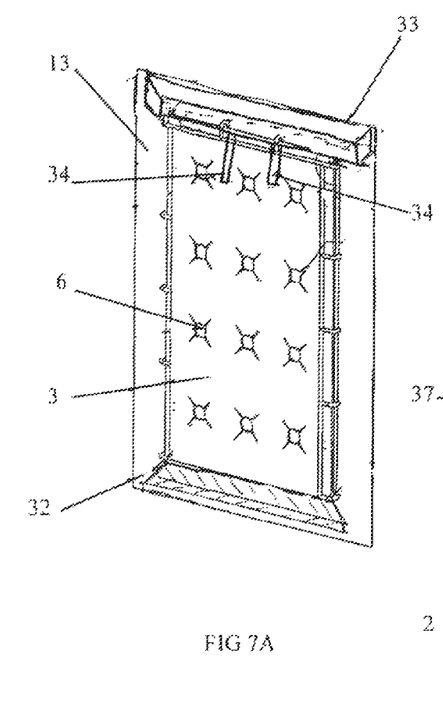
FIGS. 7A, 7B, and 7C are representative drawings of one embodiment of a vertical planter as described herein.
Figure 7B:
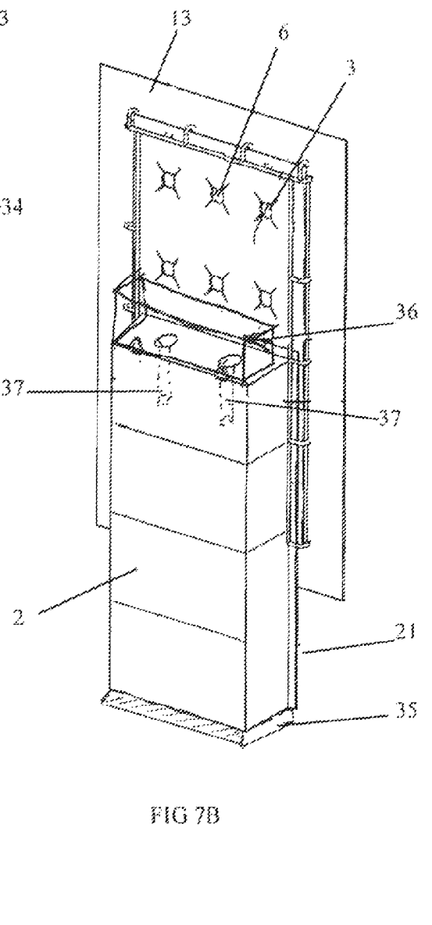

FIGS. 7A and 7B depict a further embodiment of the invention that may incorporate a reservoir or tank (33 or 36) that is concealed by the frame 13, and holds a predetermined amount of water or water fortified with fertilized or other nutrients. The water then slowly drips into the tray top holes 14, to consistently water the planter 1. Furthermore, a moisture gauge can be incorporated into the planter 1, to determine when the proper amount of water has been added to the planter 1. The gauge can then engage a valve in the reservoir to turn on or turn off the water supply and/or can provide an audible or electronic notification that attention is needed.

FIG. 7A, depicts a frame reservoir 33, that is attached to the frame 13. Extending from the frame reservoir 33 are frame reservoir tubes 34 that are intended to match up with and pair with the tray top holes 14. In this manner, the frame reservoir tubes may be about 1 mm in length to about the length of the tray. Alternatively, the tube may simply be a rubber gasket or other gasket to seal the holes between the frame reservoir 33 and the tray top holes 14. Where the length is about the same as the tray length, the ends of the tubes can be positioned either to extend to the bottom tray holes 22, or can be placed away from the bottom tray holes 22, to allow for water to exit the tube. The tubes, in this case would have perforations or holes along the length that is inside the tray 2, to allow for water to seep out of the reservoir tubes 34 or 37 to water each of the different partitions, and would function, for example, as a drip line or other similar perforated type hose. Alternatively the frame reservoir 33 can be attached to the wire grid 4.

Furthermore, the reservoir 33 may comprise a timer or other mechanism to modulate the frequency of watering the plants. This is particularly advantageous to maintaining even and consistent moisture conditions. In small installations this can allow automatic watering—which is important to many people who frequently kill their plants due to either overwatering or under watering. In other embodiments, watering can be attached to an open water line to allow the reservoir to automatically fill to provide a maintenance free watering system. Indeed, in home or commercial installations, a water line can be similarly attached to provide for such automatic watering of the system. Such automatic systems are known in the art for use in watering of lawns or other plants through simple moisture measuring devices and the use of solenoid valves to that open and close in response to the measured moisture content.

Figure 7C:
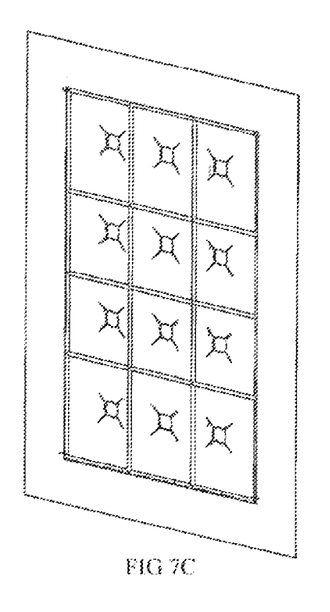

Also depicted in 7A is a frame drip container 32, which collects water and/or planting medium that falls out of the bottom tray holes 22. The frame drip container 32 is secured to the frame 13. Both the frame reservoir 33 and the frame drip container 32 are intended to be hidden behind the frame and are not visible when the planter 1 is viewed from the front, as can be seen in FIG. 7C. Alternatively, the frame drip container 32 can be secured to the wire grid 4.

FIG. 7B shows a variant of 7A, wherein the reservoir 36 and the tray drip container 35 are attached to the tray 2. The reservoir 36 and the drip container 35 have the same function as in 7A, namely, providing water and catching water and/or planting medium. Accordingly, the location of these features can be on either the frame, the wire grid or the tray. However, in each scenario, it is intended that they are of such size to be discretely located behind the frame.

The drip container 35 or 32 is particularly suited where the planter is used inside, so that water or soil does not spill out onto the floor. When used with a frame 13, the catch pan, or tray, or drip container can be effectively hidden from view. In other embodiments, the bottom tray holes 22 may be plugged to prevent water from dripping. Alternatively, the plugs may each contain a reservoir feature, so that water does not pool in the planter and these plugs can be removed and drained.

Accordingly, by use of the planting tray, the invention contemplates a system of creating a hanging vertical planter wall. The system can be shipped pre-filled with growth medium, typically some soil, or shipped empty. A consumer can then slide off the wire grid 4, fill the planter tray 2 with the appropriate growth medium, and then slide the wire grid 4 back so that the grid top frame 15 is secured around the tray rim 21.

Once filled with a grown medium, a consumer may plant seeds or live plants into the growth medium. This can be done either once the planter 1 is hung vertically, or before it is hung. Once planted, the grown medium can be moistened and once hung, the tray top holes 14 are utilized to provide moisture to the plants and/or seeds. Because of the size of the openings in the top tray holes, it is easy to water the vertical planter 1. And watering can be further simplified by inclusion of a reservoir that provides water through these top tray holes. Furthermore, because of the design of the angled partitions 19, and the center tray holes 18, water enters from the top and is dispersed throughout the planter 1, without over saturation to any particular section of the planter.

Although the present invention has been described in considerable detail, those skilled in the art will appreciate that numerous changes and modifications may be made to the embodiments and preferred embodiments of the invention and that such changes and modifications may be made without departing from the spirit of the invention. It is therefore intended that the appended claims cover all equivalent variations as fall within the scope of the invention.

What is claimed is:

1. A vertical wall planter comprising:
    a. a tray, having a length, a width, a depth, a front and a back, a top and a bottom, vertically oriented side rails, a horizontally oriented top rail, and horizontal partitions;
    b. a liner engaged to a sliding wire grid, said sliding wire grid having a top, bottom, and two sides and a track along the top oriented in a horizontal manner, and tracks along each side oriented in a vertical manner, and
    c. a frame attached to said sliding wire grid and extending beyond the top, bottom, and two sides along the plane of the sliding wire grid;
    d. wherein said horizontal partitions are angled in a vertical manner measure about 60 to 89 degrees as measured from the partition to the back of the tray; and wherein said liner comprises predetermined openings that align with the partitions in the tray; and wherein said wire grid further comprises predetermined openings that align with the openings in the liner and the partitions in the tray, when the sliding wire grid is engaged to the top and side rails.

2. The vertical wall planter of claim 1, wherein said side tracks, and top track are U-shaped, and a bottom latching mechanism, wherein said tracks are configured to engage and slide along said side rails, and wherein said top track secures around said top rail and secures said wire grid in a locked position for handing; said bottom locking mechanism releasably secured to the bottom of said tray.

3. The vertical wall planter of claim 2 wherein said bottom locking mechanism is selected from the group consisting of: snaps, magnets, string, latch, wire tie, hook and loop material, hooks, and combinations thereof.

4. The vertical wall planter of claim 1 wherein each said horizontal partition comprises at least two holes of about 5 mm to about 20 mm in diameter and situated about 5 mm to about 20 mm from the back of the tray along the length of the horizontal partition; and wherein the top and bottom of said tray also comprise holes of about 5 mm to about 20 mm in diameter situated about 5 mm to about 20 mm from the back of the tray along the length of the top and the bottom portions of the tray.

5. A vertical planting system comprising a tray, a wire grid having a plurality of openings, a top, bottom, two sides, and a U-shaped track along the two sides and the top, and a liner; wherein said tray comprises two sides, a top, a bottom, a back, and at least one partition; wherein said at least one partition is secured to said tray bottom and sides and oriented towards the vertical at an angle of about 60 to 89 degrees; and wherein said at least one partition comprises at least one hole extending through said partition; said tray further comprises at least three tray rails, one aligned along said top of the tray in a horizontal orientation and two aligned along the two sides of the tray in a vertical orientation; wherein said U-shaped track of said wire grid, selectively engages with the vertically oriented tray rails so as to allow said tracks to slide along the sides of the tray rails, and a third U-shaped track along the top of said wire grid, which secures around the top side of the tray rail; further wherein said liner comprises openings cut at predetermined positions to align with the wire grid.

6. The vertical planting system of claim 5 wherein the tray further comprises at least one hole in the back of the tray.

7. The vertical planting system of claim 5 wherein the liner is porous to air but not to water.

8. The vertical planting system of claim 5 wherein the liner is porous to air and water but not to planting medium.

9. The vertical planting system of claim 5 wherein said wire grid further comprises a locking mechanism on said bottom of said wire grid, capable of releasably locking to said bottom of said tray when said top sliding member is secured around said top side of the tray rail.

10. The vertical planting system of claim 5 wherein said liner is an AquaSave™ Coco Liner.

11. The vertical planting system of claim 5 further comprising a frame secured to said wire grid.

12. The vertical planting system of claim 5 further comprising a reservoir capable of engaging with the openings in the top of the tray.

13. The vertical planting system of claim 5 further comprising a drip tray reservoir, capable of engaging with the openings on the bottom of the tray.

* * * * *